United States Patent Office 3,182,289
Patented May 4, 1965

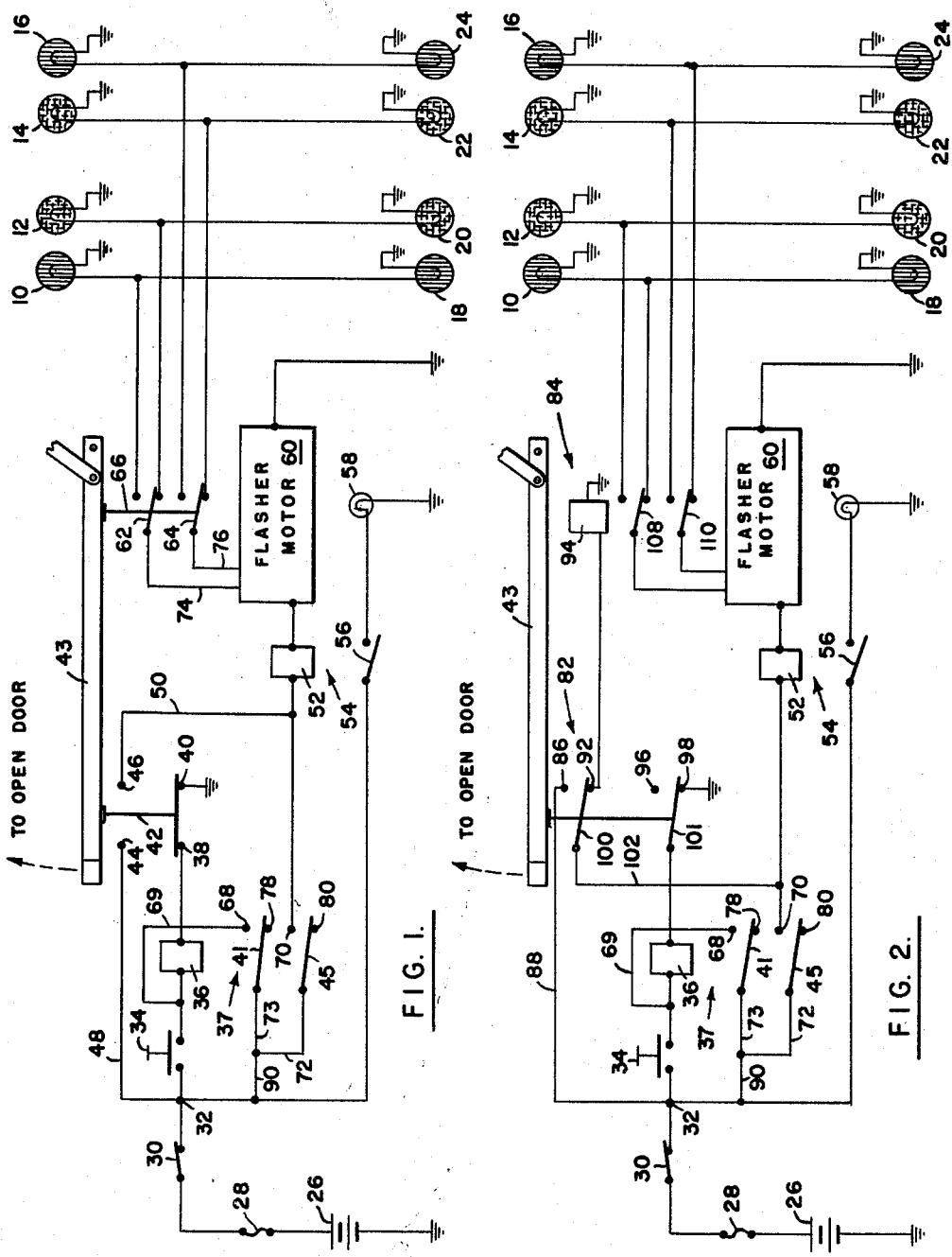

3,182,289
WARNING LIGHT CONTROL SYSTEM
Robert R. Rossi, Audubon, N.J., assignor to Arrow Safety
 Device Company, Mount Holly, N.J., a corporation of
 New Jersey
Filed Apr. 24, 1962, Ser. No. 189,881
3 Claims. (Cl. 340—83)

This invention relates to warning light systems for highway vehicles and, more particularly, to a warning light system for school buses.

Due to the fact that such warning light systems are subject to state regulation and, due to the fact that these regulations are subject to frequent change, many problems are imposed on the design of such systems. For example, when a state changes its regulations, a new system must be devised which, while complying with the new regulation, requires a minimum of change in the circuitry already incorporated in all of the existing school buses in that state. Obviously it is undesirable to have to remove all of the wires from existing buses and rewire the entire vehicle. In addition, new changes are constantly being proposed to the legislature and it is desirable that such changes be anticipated so that, in the event they become law, the wiring systems may be again changed with a minimum amount of rewiring. At the same time, all of these results must be achieved at a minimum cost of components while further providing as foolproof a system as possible. In regard to the last point, it is highly desirable that the entire system be fully automatic and not dependent upon separate manipulations of switches by the vehicle operator so as to eliminate the possibility of human error or forgetfulness.

It is therefore the general object of the invention to provide a new and improved warning light system which achieves all of the above results to a substantially greater extent than has been heretofore possible.

This general object will become more fully apparent from the following description when taken in conjunction with the attached drawings in which:

FIGURE 1 is a schematic diagram of a first embodiment of the invention; and

FIGURE 2 is a schematic diagram of a second embodiment of the invention.

Referring now to the drawings, it will be noted that each of the embodiments illustrated in FIGURES 1 and 2 employ a set of eight warning lights which it will be understood are physically positioned in sets of four on the front and rear of the bus. The set of lights at the front of the bus comprises lights 10, 12, 14 and 16, whereas, numerals 18, 20, 22 and 24 indicate the lights located at the rear of the vehicle. It will also be apparent that lights 10, 16, 18 and 24 are equipped with red lenses while lights 12, 14, 20 and 22 are equipped with amber lenses.

As pointed out hereinabove, the number of lights, the location and the timing sequence of their illumination are all regulated by state authorities. Thus, the illustrated arrangement represents that which is required by a particular state under its present regulations. These regulations require that the amber lights flash when the vehicle is approximately 300 feet before its scheduled stop to take on or discharge passengers. When the bus is stopped, the amber lights must cease to flash and the red lights must flash throughout the time that the doors are open to discharge or take on passengers. Thereafter, both the red lights and the amber lights are not to flash until the vehicle is again within 300 feet of the next scheduled bus stop. Thus, the invention resides in the control circuitry for operating these lights automatically in accordance with the above-described regulations.

Referring now to the left-hand portion of FIGURE 1, there is shown a first embodiment of a control circuit for accomplishing this purpose. The control circuit includes a first portion comprising a battery 26 with a fuse 28 and a master switch 30 connected in series therewith. Master switch 30 is of the push-pull type and is physically located in the dashboard of the vehicle. Whenever the vehicle is operating, master switch 30 is closed so that current may be supplied to the various components of the control circuit through master junction 32.

The control circuit further includes a second portion which comprises a foot operated, push button switch 34, a DPDT relay 37 having a coil 36, and a SPDT push button switch 42. Foot switch 34 is of the momentary closure type and is normally mounted on the floor board of the vehicle directly beneath the driver. Switch 42 is mounted on the front wall of the vehicle immediately adjacent door operating handle 43 so that the latter depresses switch 42 to bridge contacts 38, 40 whenever the handle is in the door closed position as illustrated in FIGURE 1. Conversely, switch 42 is biased so as to bridge contacts 44, 46 whenever handle 43 is moved from the illustrated position to open the vehicle doors.

Relay 37 includes movable switch elements 41, 45 connected to junction 32 by leads 90, 72 and 73.. Elements 41 and 45 are adapted to engage operative contacts 68, 70 when coil 36 is energized and to engage inoperative contacts 78, 80 when the coil is deenergized. Contact 68 is connected back to the positive terminal of coil 36 by lead 69 so that a holding circuit is established through switch 41 and switch 42 whenever the former engages contact 68 and the latter simultaneously bridges contact 38 and grounded contact 40. In turn, contact 44 of switch 42 is connected to junction 32 by lead 48 and a second lead 50 interconnects contact 46 with both contact 70 of relay 37 and coil 52 of a pilot relay 54. Pilot relay 54 includes a switch 56 so that current is supplied through pilot light 58 to ground whenever relay 54 is energized. It will be understood that pilot light 58 is normally positioned on the dashboard of the vehicle so as to indicate the operative state of the system to the operator of the vehicle.

The control circuit further includes a conventional flasher motor 60 which is connected in series between coil 52 and ground and which is operative to supply current pulses to movable switch elements 62 and 64 of DPDT push button switch 66. Switch 66 is actuated by the movements of handle 43 so that switch elements 62 and 64 normally contact the terminals associated with the amber lights whenever handle 43 is in its door closed position. Conversely, switch 66 establishes a current path to the red lights when handle 43 is moved to its door opening position.

The operation of the first embodiment is as follows. It is to be assumed that all of the switches and relays are initially in the positions illustrated in FIGURE 1 with the vehicle in operation and approaching the scheduled bus stop. At this time the operator momentarily closes foot switch 34 so that current is supplied from junction 32 through switch 34 and through coil 36 to switch 42 which establishes a path to ground through contact 40. This energizes coil 36 so that switches 41 and 45 are moved into engagement with contacts 68 and 70, respectively. Since terminal 68 is connected back to the positive side of coil 36, a holding circuit is thereby established so that coil 36 remains energized after foot switch 34 is opened. Simultaneously, switch 45 engages contact 70 so that current is supplied through coil 52 and flasher motor 60 to ground. The energization of coil 52 simultaneously closes switch 56 so that pilot light 58 indicates the operative condition of the control circuit to the operator. Immediately upon actuation of flasher motor 60, pulsating current is supplied through leads 74 and 76 to switches 62 and 64 which are then in the position illustrated in FIGURE 1 whereby current is supplied to grounded amber lights 12, 14, 20 and 22 causing them to flash intermittently.

While the above description necessarily sets forth the operation in terms of a sequence of events, it will be understood that the actual effect is the illumination of the amber lights immediately upon the initial closure of foot switch 34 and the retention of this operative condition after momentary switch 34 is opened. Thus, the amber lights continue to flash as the vehicle approaches its scheduled stop.

Upon reaching the bus stop, the operator then moves handle 43 in order to open the bus doors. Movement of handle 43 in this direction permits switch 42 to move upwardly and bridge contacts 44 and 46 so that current is then supplied from junction 32 through lead 48, switch 42, lead 50, coil 52 and grounded flasher motor 60. Thus, both the pilot light 58 and flasher motor 60 continue to be energized. However, the above-described movement of switch 42 breaks the contact between terminals 38 and 40 so that coil 36 is deenergized and switches 41 and 45 drop back to the position shown in FIGURE 1 wherein they again engage inoperative terminals 78 and 80 thus restoring relay 37 to its initial condition. Simultaneously, the movement of handle 43 allows switch 66 to move upwardly so that elements 62 and 64 then engage the terminals connected to red lights 10, 16, 18 and 24. Thus, the opening of the vehicle doors automatically deenergizes the amber lights and causes the red lights to flash intermittently.

Upon the closure of the vehicle doors, handle 43 again returns switches 42 and 66 to the positions shown in FIGURE 1. However, none of the components are then actuated due to the fact that previously deenergized relay 37 cannot again be energized until foot switch 34 is closed. Thus, both the amber and red lights are deenergized and the control circuit remains in this condition until the vehicle again approaches a bus stop and the operator repeats the cycle by actuating foot switch 34.

Referring now to FIGURE 2, there is illustrated a second embodiment of the invention which is identical to that just described except for the substitution of a DPDT push button switch 82 in place of switch 42 and DPDT relay 84 in place of switch 66. In all other respects the components of this embodiment are identical to their corresponding components in the previously described embodiment and, accordingly, the same, reference numerals have been applied thereto. These components are electrically connected to cooperate with switch 82 and relay 84 in the following manner.

Referring first to switch 82, the uppermost contact 86 is connected to main junction 32 by lead 88. The second contact 92 of switch 82 is connected to grounded coil 94 of relay 84. The third contact 96 of switch 82 is not utilized in the circuit and the fourth contact 98 is connected to ground. Movable switch element 100 is connected to terminal 70 of relay 37 through lead 102 which lead also connects movable element 100 with coil 52 of relay 54. Movable contacts 45 and 41 of relay 37 are connected through leads 72, 73 and 90 to main junction 32. As in the first embodiment, the uppermost contact 68 of relay 37 is connected through lead 69 to the positive terminal of coil 36 so that the coil is energized whenever switch 41 engages contact 68 and switch 101 simultaneously engages contact 98.

Referring now to relay switch 84, this relay includes movable contacts 108 and 110 which are connected to receive pulsating current from flasher motor 60. Movable contacts 108 and 110 are adapted to establish current paths to the red lights when coil 94 is deenergized and, alternatively, to establish current paths to the amber lights when coil 94 is energized.

The operation of this embodiment is as follows. Assuming the vehicle to be in motion and master switch 30 to be closed, the operator momentarily depresses foot switch 34 as the vehicle approaches the scheduled bus stop. This establishes a current path from main junction 32 through coil 36 of relay 37 by means of switch 101 which is then in engagement with grounded contact 98. Immediately upon the energization of coil 36, movable switches 41 and 45 are moved upwardly into engagement with contacts 68 and 70, respectively. Current is then supplied through coil 36 by means of leads 90, 73 and 69 so that the holding circuit is established and, thereafter, momentary switch 34 may be released since it performs no further function. This movement of element 45 into engagement with contact 70 energizes both coil 52 of pilot relay 54 and flasher motor 60. Thus, switch 56 is closed and pilot light 58 is illuminated. In addition, flasher motor 60 then supplies the pulsating current to contacts 108 and 110. Simultaneously, current is supplied through movable element 45, contact 70, lead 102, movable element 100, and contact 92 to coil 94 of relay 84 thus energizing this relay. Upon energization, movable elements 108 and 110 move upwardly into engagement with the contacts connected to amber lights 12, 14, 20 and 22. Of course, all of the switch movements just described occur instantaneously upon closure of foot switch 34 so that the practical result is the immediate illumination of pilot light 58 and the repetitive flashing of the amber lights.

When the vehicle has reached the bus stop and the operator moves handle 43 to open the vehicle doors, switch 82 moves upwardly such that movable element 100 engages contact 86 and movable element 101 engages inoperative contact 96. Movement of the latter obviously deenergizes coil 36 of relay 37 so that switch elements 41 and 45 move downwardly into engagement with inoperative contacts 78 and 80. However, current is then supplied from junction 32 through lead 88 to contact 86 which, due to the engagement of element 100 therewith, establishes a current path through lead 102 to coil 52 of relay 54 so that both relay 54 and flasher motor 60 remain energized. In this condition, coil 94 of relay 84 is deenergized since movable contact 100 no longer engages contact 92 so that movable elements 108 and 110 move downwardly into engagement with the contacts connected to red lights 10, 16, 18 and 24. This condition remains until the vehicle doors are closed by movement of handle 43 back to the position illustrated in FIGURE 1, in which event, switch 82 is again moved downwardly into its initial position whereupon relay 54 is deenergized and the entire control system is ready to repeat the above-described sequence.

From the foregoing description it will be apparent that the subject invention provides for extremely simple and economic conversion of presently existing warning systems to meet the requirements of new state regulations. This is particularly due to the fact that the subject invention utilizes the same elements already found in most existing systems, such as the battery, fuse, master switch, pilot light relay, indicator light 58, flasher motor 60 and at least one DPDT relay which may be connected to operate as relay 37. Thus, the present invention makes possible the provision of conversion kits containing only elements such as foot switch 34, a switch corresponding to that illustrated as 66 in FIGURE 1 and 82 in FIGURE 2, a switch such as 42 or a second relay such as 84. In this manner the wiring already contained in the vehicle may be utilized and only the changing of some of the terminal connections and the addition of those components contained in the conversion kit is required.

It is to be understood that the foregoing disclosure relates to preferred embodiments and that the invention is not to be limited other than as specifically set forth in the following claims.

What is claimed is:

1. A warning light system for a door containing vehicle comprising at least one caution light and at least one stop indicating light mounted on the vehicle, said lights being of different colors, circuit means including a current source and switch means for initially energizing said caution light upon closure of said switch means, said switch means comprising a switch of the momentary closure type which reopens automatically, second circuit means including a relay operated switch means connected to said current source for continuing to energize said caution light after said switch means automatically reopens, third circuit means connected to said current source and including a switch means operated by movement of the vehicle door for automatically deenergizing said caution light and automatically energizing said stop light upon opening of said door and continuing to energize said stop light so long as said door remains open, and fourth switch-controlled circuit means operatively connected to said door for automatically deenergizing said stop light upon closure of said door.

2. A warning light system according to claim 1 wherein said caution light is amber and said stop indicating light is red and comprising a flasher means in said second and third circuit means for supplying current pulses to said lights whereby said lights flash on and off to provide the caution and stop indications.

3. In a warning light system for a vehicle having a door, the combination comprising a current source, at least one caution light and at least one stop indicating light mounted on the vehicle, a manually operable switch, a relay having a coil and a switch responsive to the energization of the coil for movement between an open position and a closed position, a first circuit means connecting said source through said coil for energizing the same to actuate said relay switch from its open to its closed position, second circuit means connecting said source through said relay switch to said caution light for energizing the same, third circuit means connecting said source to said stop light for energizing the same, control switch means serially connected in said first and second circuit means for controlling current flow therethrough and movable between a first control position in which said first circuit means energizing said coil is closed and in which the third circuit means energizing said stop light is opened to a second control position in which said first circuit means energizing said coil is open and said third circuit means energizing said stop lights is closed, and means operatively connecting said control switch means to the vehicle door for movement from said first position to said second position as said door is moved from its closed to an open position whereby the first circuit means is broken to deenergize said coil and said caution light and said third circuit means is completed to energize said stop lights, said control switch being movable from its second control position to its first control position by said last-mentioned means in response to a closing movement of the door to break said third circuit means and deenergize said stop lights.

References Cited by the Examiner
UNITED STATES PATENTS

| | | | |
|---|---|---|---|
| 2,144,813 | 1/39 | Roan et al. | 340—130 |
| 2,617,902 | 11/52 | Lincoln et al. | 340—56 |
| 2,677,752 | 5/54 | Kaiser | 240—7.1 |
| 2,750,578 | 6/56 | Petrella et al. | 340—66 |
| 2,920,309 | 1/60 | Fultz | 340—120 |
| 2,924,817 | 2/60 | Dawkins | 340—81 |

NEIL C. READ, *Primary Examiner.*

ROBERT H. ROSE, *Examiner.*